United States Patent [19]

Fischer et al.

[11] Patent Number: 4,599,698

[45] Date of Patent: Jul. 8, 1986

[54] AIRCRAFT TRIM ACTUATOR SHUTDOWN MONITOR SYSTEM AND METHOD

[75] Inventors: William C. Fischer, Monroe; Don L. Adams, Fairfield; Stuart C. Wright, Milford; David J. Verzella, Guilford, all of Conn.

[73] Assignee: United Technologies Corporation, Hartford, Conn.

[21] Appl. No.: 490,698

[22] Filed: May 2, 1983

[51] Int. Cl.[4] .................. G05D 1/00; G05D 23/02; G06F 15/20

[52] U.S. Cl. .................. 364/551; 364/433; 364/434; 318/565; 244/194

[58] Field of Search .......... 364/424, 433, 434, 551; 244/194, 195; 318/565; 371/16, 25, 68

[56] References Cited

U.S. PATENT DOCUMENTS

| 3,969,664 | 7/1976 | Camillieri et al. | 318/565 |
|---|---|---|---|
| 4,043,526 | 8/1977 | Donley et al. | 244/195 |
| 4,337,516 | 6/1982 | Murphy et al. | 364/551 |
| 4,374,423 | 2/1983 | Kundler et al. | 364/434 |
| 4,472,806 | 9/1984 | Blair | 371/68 |

OTHER PUBLICATIONS

Stern: Preliminary Design of an Integrated Redundant Digital Flight Control System for the Maritime Patrol Aircraft.
Conference Fort Worth, TX, USA. Challenge of the 80's, 3rd. Digital Avionics Systems, Nov. 1979, pp 101-116.

Primary Examiner—Felix D. Gruber
Attorney, Agent, or Firm—Francis J. Maguire, Jr.

[57] ABSTRACT

The directions of travel of an inner and an outer loop actuator are monitored for movement in opposite directions within selected ranges and the outer loop actuator is disabled under selected conditions. These conditions may include movement of both the inner and outer loop actuators in opposite directions, any one of which has been detected moving at a rate greater than a selected rate or to a position outside a selected range. The invention is particularly suited for an aircraft trim actuator shutdown monitor system.

39 Claims, 3 Drawing Figures

AIRCRAFT TRIM ACTUATOR SHUTDOWN MONITOR SYSTEM AND METHOD

DESCRIPTION

1. Technical Field

This invention relates to an aircraft protective system and more particularly to a helicopter trim actuator shutdown monitor system.

2. Background Art

As is well known in the art, trim actuator performance can be continuously monitored and compared to reference values which define the limits of performance, beyond which a failed condition is defined to exist. In such a system a trim actuator position signal is differentiated to provide a rate signal which is compared to an allowed range of rate signal values. The command signal to the trim actuator is also monitored and compared to an allowed range of command signals. When either the rate signal or the command signal exceeds an allowed range, a conditional trim actuator shutdown signal is initiated. The conditional shutdown signal is delayed for a short period of time to ensure that transient shutdown signals do not result in nuisance trips of the trim actuator. If the duration of such a shutdown signal exceeds a timing threshold a trim actuator shutdown signal results.

A problem of this type of monitor system is the artificiality of the ranges of allowed performance values. Performance values that exceed the allowed ranges are not necessarily accurate determinants of a shutdown condition.

DISCLOSURE OF INVENTION

The object of the present invention is to provide a trim actuator shutdown monitor system that overcomes the artificiality of the prior art shutdown monitor system.

According to the present invention, the position and direction of travel of a trim actuator is continuously monitored and its rate of change in position with respect to time continuously determined. If the rate of change in position exceeds allowed values in either of the two possible directions of travel then one of the two requirements for a conditional shutdown is met. The direction of travel of the trim actuator when an allowed rate value is exceeded is identified for a reason that will become apparent hereinafter.

In further accord with the present invention, the position and direction of travel of a stability augmentation system (SAS) actuator in the same pitch axis control channel as the trim actuator is monitored. If the position exceeds allowed values in either of the two possible directions of travel then one of the two requirements for a conditional shutdown is met. The direction of travel of the SAS actuator when an allowed direction value is exceeded is identified for the same reason that the direction of an excessive trim actuator rate is identified and which will become apparent hereinafter.

In still further accord with the present invention, the direction of travel of both the trim actuator and the SAS actuator are identified according to the effect the travel direction has on the aerodynamic surfaces that the actuators together control. If the travel direction of the trim actuator is such that the trim actuator affects certain of the aircraft's aerodynamic surfaces in a manner opposite to the manner in which the SAS actuator affects the same surfaces then the trim and SAS actuators are considered, for the purposes of the present invention, to be traveling in opposite directions. If the rate of change in position of the trim actuator exceeds an allowed rate value while the position of the SAS actuator simultaneously exceeds an allowed position value and the trim and SAS actuators are traveling in opposite directions, then a conditional trim actuator shutdown state is caused to exist.

In still further accord with the present invention, a conditional trim actuator shutdown state is prevented from causing a preliminary trim actuator shutdown state to exist if one or more of certain selected conditions related to operator maneuvering of the aircraft, aircraft airspeed, or other flight conditions are met.

In still further accord with the present invention, if any of the selected conditions for preventing a conditional trim actuator shutdown state from causing a preliminary trim actuator shutdown state to exist are not met, the existence of a conditional shutdown state causes a preliminary shutdown state to exist.

In still further accord with the present invention, if a preliminary trim actuator shutdown state exists continuously for a discrete time interval an actual trim actuator shutdown command state is caused to exist.

In still further accord with the present invention, the range of rate values allowed for the trim actuator and the range of position values allowed for the SAS actuator may be manually or automatically varied according to the operational status of the automatic flight control system (AFCS) or any other parameter, condition, or state related to the aircraft and its operation.

The present invention accommodates the need for an improved trim actuator shutdown monitor by overcoming the artificiality of the prior art by monitoring the travel directions of both inner and outer loop actuators and causing a conditional shutdown signal only if the actuators are traveling in opposite directions while exceeding selected position or rate limits. Nuisance shutdowns are reduced by preventing a conditional shutdown state from becoming a preliminary shutdown state in the presence of certain selected operational flight conditions.

The invention may be practiced in a variety of aircraft types, including fixed wing aircraft, helicopters, and combinations thereof, and may be implemented with analog, digital, or combination analog and digital signal processing methods, utilizing apparatus and techniques which are readily available in the art, in the light of the teachings which follow hereinafter.

The foregoing and other objects, features and advantages of the present invention will become more apparent in the light of the following detailed description of best mode embodiments thereof, as illustrated in the accompanying drawing.

BEST MODE FOR CARRYING OUT THE INVENTION

Figure 1:
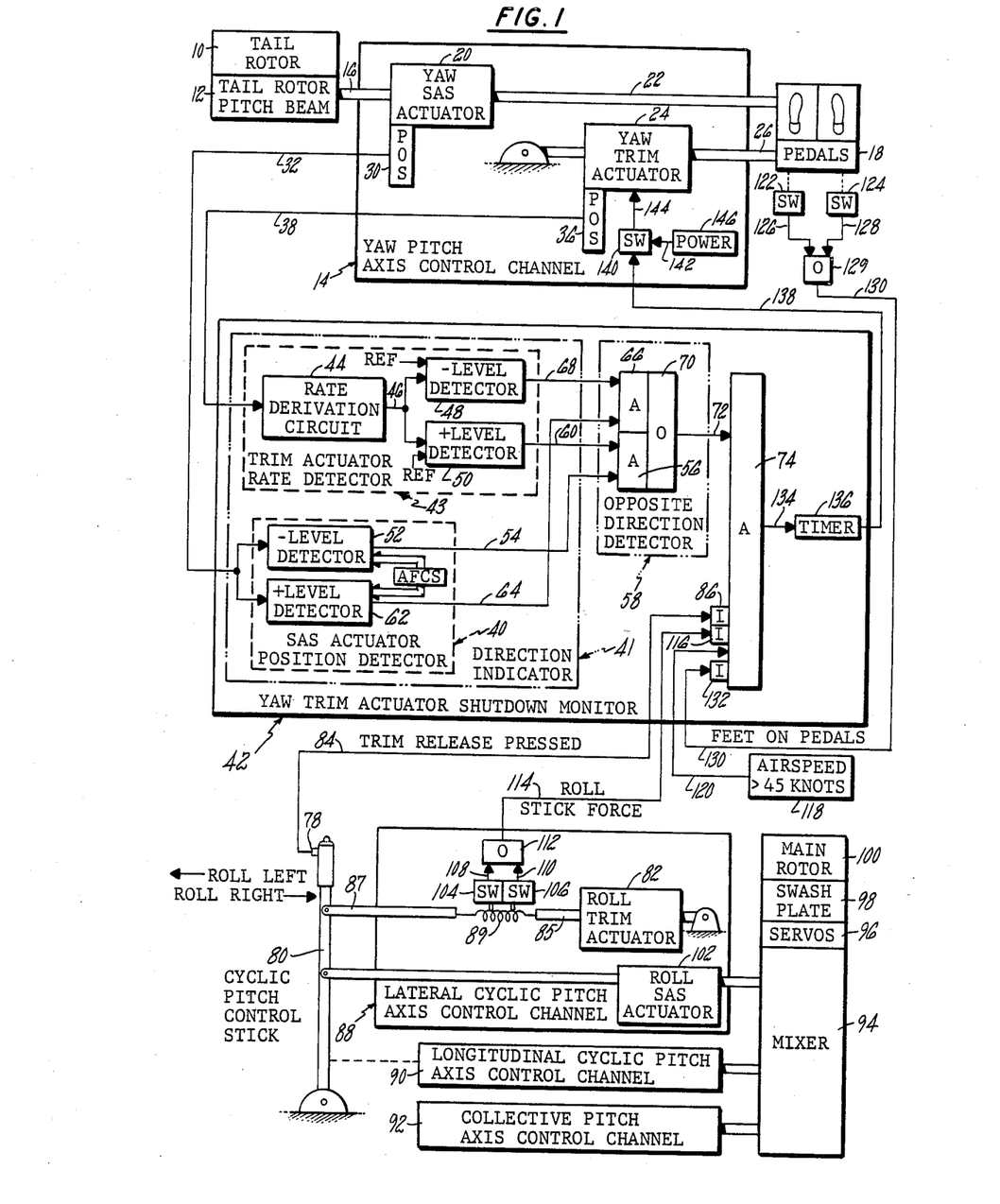
FIG. 1 is a simplified schematic block diagram of an aircraft system employing a trim actuator shutdown monitor, according to the present invention.

Referring to the simplified schematic block diagram of FIG. 1, the pitch of the blades of the tail rotor 10 of the helicopter is controlled by a tail rotor pitch beam 12 which receives its input from the yaw pitch axis control channel 14 through a mechanical linkage 16.

The operator provides input to the yaw pitch axis control channel 14 by means of yaw pitch control pedals 18. The pedals are mechanically connected to a yaw inner loop stability augmentation system (SAS) actuator 20 through a mechanical linkage 22 and to a yaw outer loop trim actuator 24 by a mechanical linkage 26.

The position of the yaw SAS actuator 20 is sensed by a position sensor 30 which generates a bipolar yaw SAS actuator position signal on a line 32. The bipolar position sigal has a value equal to zero when the yaw SAS actuator position is at the fifty percent point of the full range of SAS actuator travel. The region corresponding to the range of from zero to fifty percent of SAS actuator travel is assigned negative position signal values. The absolute values of the position signal values in the negative region are equal to a maximun value at the zero percent point of SAS actuator travel and decrease linearly to zero at the fifty percent point of SAS actuator travel. The region corresponding to the range of from fifty to one hundred percent of SAS actuator travel is assigned positive position signal values. The position signal values in the positive region are equal to a maximum value at the one hundred percent point of SAS actuator travel and decrease linearly to zero at the fifty percent point of SAS actuator travel. The yaw SAS actuator output position signal 32 is presented to a SAS actuator position detector 40 that is part of a direction indicator 41 in a yaw trim actuator shutdown monitor 42. The SAS actuator position detector 40 tests the yaw SAS actuator position signal 32 to determine whether it is within a selected range of full yaw SAS actuator output travel. In the best mode embodiment, the selected range of full SAS travel depends on whether the coupled flight director (CFD) mode of the automatic flight control system (AFCS) is operative or not. With the CFD operative, the selected range of SAS actuator ouptut travel includes the ranges of from zero to twelve and one-half percent (hereinafter the negative selected range) and from eighty-seven and one-half to one hundred percent (hereinafter the positive selected range) of full SAS actuator output travel. The position detector 40 includes a negative selected range level detector 52 and a positive selected range level detector 62 which include separate comparator circuits having negative and positive voltage reference levels respectively, as is well known in the art.

The level detector 52 provides an output on a line 54 if the yaw SAS actuator position signal on the line 32 is within the negative selected range. The output signal on the line 54 is applied to an AND gate 56 of an opposite direction detector 58. The level detector 62 provides an output on a line 64 if the yaw SAS actuator position signal on the line 32 is within the positive selected range. The output signal on the line 64 is applied to an AND gate 66 of the opposite direction detector.

With the CFD inoperative, the selected range of SAS actuator output travel includes the ranges of from zero to twenty-five percent and from seventy-five to one hundred bercent of full SAS actuator output travel. The selected range is broadened with the CFD inoperative because the magnitudes of opposing SAS and trim actuator movements in the yaw pitch axis control channel tend to be less with the CFD inoperative.

The position of the yaw trim actuator 24 is sensed by a position sensor 36 that generates a bipolar yaw trim actuator position signal on a line 38 which is similar to the bipolar yaw SAS actuator position signal on the line 32.

The yaw trim actuator output position signal 38 is presented to a trim actuator rate detector 43. The derivative with respect to time of the yaw trim actuator position signal is taken in a rate derivation circuit 44. A rate signal on a line 46 is presented to a pair of level detectors 48, 50 which determines whether the rate signal is within a selected negative or positive range of trim actuator rate signal values. In the best mode embodiment the maximum allowed rate is equal to two and one-half percent of full range per second, which is equivalent to fifty percent of the maximum designed actuator rate in either the positive or negative directions of travel. The level detectors 48, 50 include separate comparator circuits having negative and positive voltage reference levels respectively, as is well known in the art.

The level detector 48 provides an output on a line 68 when the yaw trim actuator rate signal on the line 46 is within a selected negative range of trim actuator rate signal values. The output signal on the line 68 is applied to the AND gate 66 of the opposite direction detector. The level detector 50 provides an output on a line 60 when the yaw trim actuator rate signal on the line 46 is within a selected positive range of trim actuator rate signal values. The output signal on the line 60 is applied to the AND gate 56 of the opposite direction detector.

The selection of the polarities of the position signals 32, 38 is made so that an increasing positive trim actuator position signal and an increasing positive SAS actuator position signal correspond to motions of the trim and SAS actuators that affect the aerodynamic surfaces they together control in an aiding manner. In this manner, strongly opposing motions of the actuators may be inferred from the simultaneous presence of signals indicative of opposing motions of the SAS actuator within a selected range of position and of the trim actuator at a rate greater than a selected rate.

The output signals 68, 60, 54, 64 of the level detectors 48, 50, 52, 62 are presented to the AND gates 66, 56 so that direction signals having opposite polarities are paired at the input to each AND gate.

If both the yaw trim actuator rate signal on the line 46 and the yaw SAS actuator position signal on the line 32 are within a selected range of the rate detector 43 and the position detector 40, respectively, and the polarities of the ranges are opposite, then one of the two AND gates 56, 66 of the opposite direction detector generates an output signal to an OR gate 70 which generates a conditional yaw trim actuator shutdown signal on a line 72.

The conditional trim actuator shutdown signal on the line 72 is gated in an AND gate 74 with several other signals to be described hereinafter.

A trim release pressed signal on a line 84 indicates that the operator has pressed the trim release switch 78 on the cyclic pitch control stick 80. If the operator deactivates the roll trim actuator 82 by pressing the trim release push button 78, the trim release signal on the line 84 is provided to an inverter 86 which provides a signal to the AND gate 74 when the trim release push button is not pressed. When the operator presses the trim release push button 78, operator induced control actions in the lateral cyclic pitch axis control channel 88 are indicated. This is due to the fact that the operator may choose to release the roll trim actuator from its control function in the lateral cyclic pitch axis control channel 88 so that the cyclic pitch control stick 80 may be moved about freely by the operator without having to overcome the force formerly exerted on the control linkages by the roll trim actuator 82. During such periods of operator maneuvering it is desirable to inhibit the conditional yaw trim actuator shutdown signal on the line 72 by providing the trim release pressed signal on the line 84 to the inverter 86. If the inverter 86 is presented with a trim release pressed signal it does not provide a signal to the AND gate 74 and any conditional shutdown signals on the line 72 are inhibited.

As is known in the art, the lateral cyclic pitch axis control channel 88, the longitudinal cyclic pitch axis control channel 90, and the collective pitch axis control channel 92 provide inputs to a mixer 94 that controls servos 96 that relate to the various controlable axes of a swash plate 98. The swashplate controls the pitch of the blades of the main rotor 100. The lateral cyclic pitch axis control channel is shown in simplified form having a roll trim actuator 82 and a roll SAS actuator 102. The longitudinal cyclic pitch axis control channel 90 and the collective pitch axis control channel 92, although not shown in detail, are similar. If the roll trim actuator 82 adjusts the position of a linkage 85, and through a spring 89, a linkage 87, the cyclic pitch control stick 80 will move commensurately. But, if the operator desires to override the operation of the roll trim actuator by application of sufficient force, the operator can overcome the spring 89 and cause motion of the linkage 87, 85 to be different than that commanded by the roll trim actuator 82. When this occurs, one of a pair of switches 104, 106 will sense the contraction or expansion of the spring 89 and provide a roll force signal due to spring contraction on a line 108 or a roll force signal due to spring expansion on a line 110. A roll force signal is detected by an OR gate 112. The roll force signal on the line 114 is inverted by an inverter 116 which does not provide a roll force signal to the AND gate 74 when there is roll stick force exerted by the operator. A roll stick force signal on the line 114 is indicative of operator maneuvering of the aircraft in the lateral pitch axis. During periods of operator maneuvering in the lateral pitch axis it is desirable to inhibit the conditional yaw trim actuator shutdown signal on a line 72 by providing the roll stick force signal on the line 114 to the inverter 116. The roll stick force signal on the line 114 is inverted by the inverter 116 and the resulting inversion of the input to the AND gate 74 prevents the AND gate 74 from providing a preliminary shutdown signal on a line 134 to a timer 136.

An airspeed greater than forty-five knots signal on a line 120 is provided by an airspeed transducer 118 to the AND gate 74 which permits the AND gate to provide a preliminary shutdown signal on the line 134 to the timer 136 if the conditional shutdown signal on the line 72 is present, the other signal inputs to the AND gate 74 are also present, and the airspeed is greater than forty-five knots. It is desirable to provide a trim actuator shutdown function only at high speeds because the side slip structural stresses on the rear fuselage that may suddenly occur due to a malfunction in the yaw trim actuator pose no potential danger at low speeds.

A feet on pedals signal on a line 130 is provided to an inverter 132 that provides an input to the AND gate 74 if the operator does not have his feet on the pedals. This inhibits shutdown of the yaw trim actuator during periods of operator control actions in the yaw pitch axis control channel as evidenced by the operator's feet on the pedals. The sensing of the presence of the operator's feet on the pedals is accomplished with a pair of switches 122, 124 which provide a foot on pedal signal on a line 126 or a line 128. If an OR gate 129 is presented with a foot on pedal signal it presents a feet on pedals signal on the line 130 to the inverter 132. It is desirable to inhibit the shutdown of the yaw trim actuator during periods of operator maneuvering in the yaw pitch axis and the feet on pedals signal on the line 130 accomplishes this if one or both of the pedal switches are actuated.

The AND gate 74 provides a preliminary yaw trim actuator shutdown signal 134 to the timer 136 in the simultaneous presence of a conditional yaw trim actuator shutdown signal on the line 72, conditional signals from the inverters 86, 116, 132, and an airspeed greater than forty-five knots signal on the line 120. The conditional yaw trim actuator shutdown signal will not be permitted to cause a preliminary shutdown signal 134 to exist unless all of the conditional signals are met.

It should be understood that the conditional signals input to the AND gate 74 to be gated with the conditional shutdown signal on the line 72 are not the only signals that could be used, nor is it necessary for them all to be used. Nuisance trips may be inhibited by other means as well. For example, the inhibit function may be accomplished by resetting a timer used to delay a shutdown. It should also be understood that the invention may be practiced without provision for avoiding nuisance trips or for delaying shutdown.

The preliminary yaw trim actuator shutdown signal on a line 134 is presented to the timer 136, which presents an actual yaw trim actuator shutdown signal on a line 138 only if the continuous duration of the preliminary shutdown signal is greater than a selected period. For example, approximately 200 milliseconds was selected in the best mode embodiment.

The actual yaw trim actuator shutdown signal on the line 138 is applied to a power interrupt switch 140 which interrupts the flow of current on a line 142 and on a line 144 from a power source 146.

It should be observed that the trim actuator, under the best mode embodiment, will be shut down even if the actual cause of the shutdown condition is a faulty SAS actuator. This possibility is tolerated because in the event the SAS actuator is at fault, and the trim actuator is disabled, the effect on the operation of the aircraft is relatively minor and can easily be overcome by the operator.

This is due to the fact, as is well known in the art, that with respect to the full range of position of the controlled aerodynamic surfaces, the total instantaneous dynamic range of control of the SAS actuator is relatively small compared to the trim actuator's range. By instantaneous dynamic range of control is meant that the total range of the SAS actuator is not restricted to any one static placement of the total SAS control range with respect to the controlled surfaces, but that the placement of the total range continuously changes according to and in tandem with the instantaneous position of the controlled surfaces.

It should be understood that although the best mode embodiment uses actuator position sensors that generate bipolar position signals, position sensors that generate unipolar signals might also be used. Such unipolar signals would be converted to bipolar by introducing a bias onto the signals to make them bipolar as is well known in the art.

It should also be understood that although the best mode embodiment utilizes a single SAS actuator and a single trim actuator, other embodiments that utilize more than a single SAS or trim actuator may be used with the invention.

Figure 2:
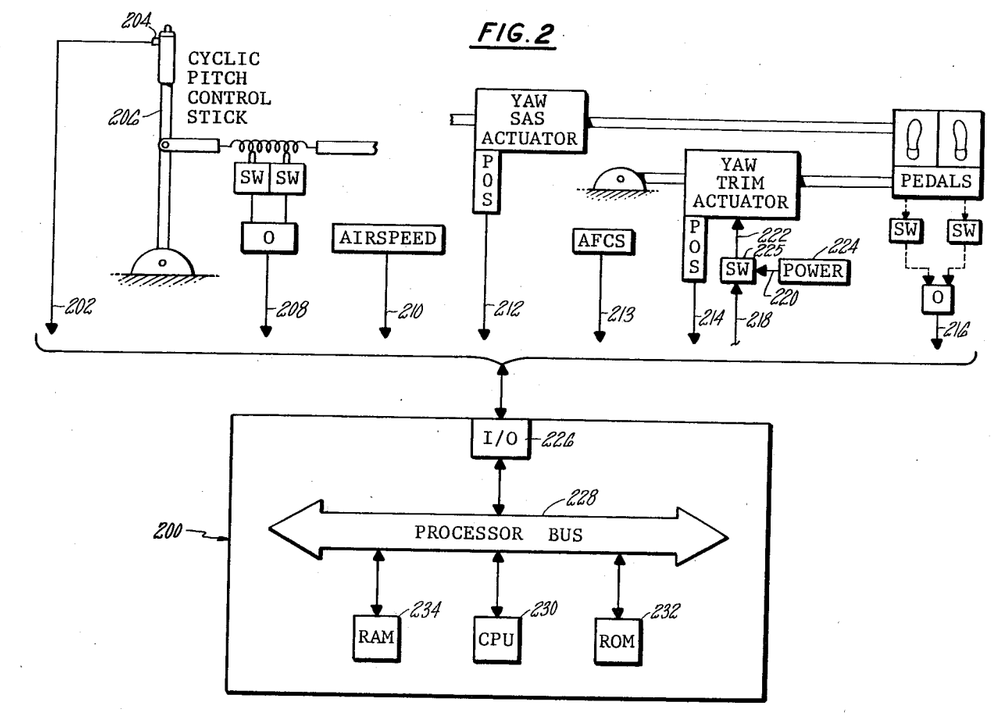
FIG. 2 is a simplified block diagram of a digital embodiment of the shutdown monitor of FIG. 1.

In FIG. 1, the shutdown monitor is embodied in discrete hardware components which sense signals related to yaw SAS and trim actuator position, airspeed, trim release, roll stick force, and feet on pedals to determine whether trim actuator shutdown should be effected and which transmit a shutdown signal to a trim actuator shutdown switch if that determination is made. In an alternative embodiment, the function of the shutdown monitor may be implemented with a signal processor as shown in FIG. 2, which is an illustration of a signal processor 200, which receives a trim release pressed signal on a line 202 from a trim release pushbutton 204 on a cyclic pitch control stick 206, a roll stick force signal on a line 208, an airspeed signal on a line 210, a yaw SAS actuator position signal on a line 212, an CFD signal on a line 213, a yaw trim actuator position signal on a line 214, and a feet on pedals signal on a line 216 at an input/output port 226 and which transmits a trim actuator shutdown signal on a line 218 which interrupts the flow of current on a line 220 and on a line 222 from a power source 224 by opening a switch 225, from the input/output port 226. The input/output port transmits signals to and receives signals from a processor bus 228 which is connected to a central processing unit (CPU) 230. The CPU processes received signals according to a logical sequence stored in memory which may be read only memory (ROM) Z32. The logical sequence for the alternative embodiment is detailed by the flow chart in FIG. 3. The processor bus is used by the CPU to gain access to the program steps and to numerical constants stored in ROM and for access to memory which may be random access memory (RAM) 234 for temporary storage of the results of computational steps in the logical process. If a trim actuator shutdown decision is reached by the CPU, a yaw trim actuator shutdown signal is transmitted through the input/output port 226 to the switch 225 which removes power from the actuator.

Figure 3:
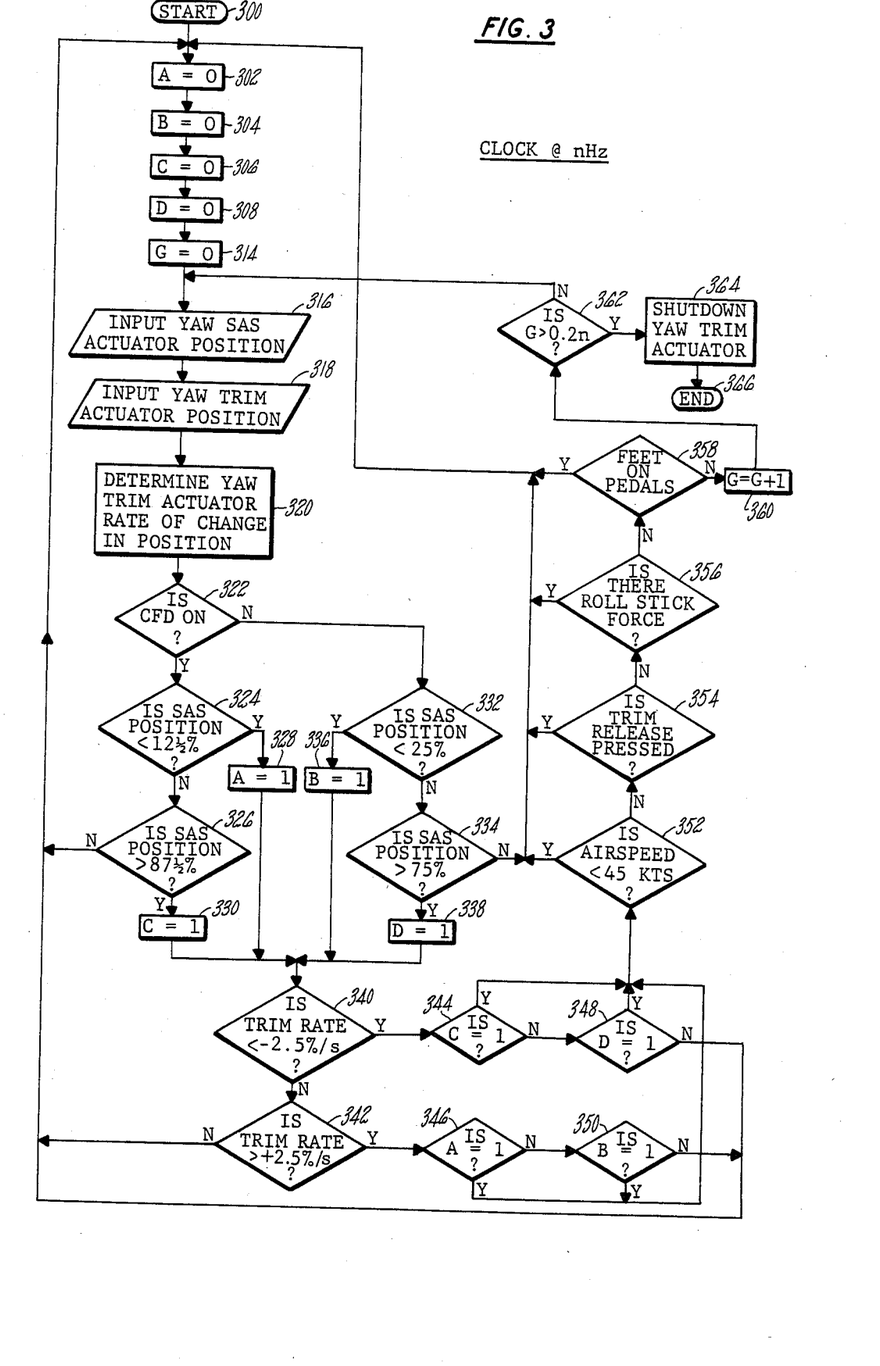
FIG. 3 illustrates the logical process by which the processor of FIG. 2 arrives at a shutdown decision.

Referring now to FIG. 3, the logical process by which the signal processor of FIG. 2 arrives at a decision as to whether or not to shut down the trim actuator is illustrated. Assuming a clock signal at n Hertz, the logical sequence begins at a start block 300. After setting all the variables to zero in initializing steps 302–314, the current yaw SAS and trim actuator position values are obtained in steps 316, 318. After determining the yaw trim actuator rate of change in position in an operational step 320, a decision is made on whether the CFD is operational or not in a decision step 322. Depending on the operational state of the CFD, the SAS actuator position value is compared to one of two selected ranges of values.

If the CFD is operational, a decision is made in a decision step 324 as to whether the current SAS position value is less than twelve and one-half percent of full SAS actuator travel. If not, a decision is made in a decision step 326 as to whether the current SAS position value is greater than eighty-seven and one-half percent of full SAS actuator travel. If the SAS position value is determined in the step 324 to be less than twelve and one-half percent of full SAS actuator travel, a variable A is set equal to one in a step 328. If the SAS position value is determined in the step 326 to be less than eighty-seven and one-half percent of full SAS actuator authority then the logical flow is returned to the initializing step 302. If it is greater than eighty-seven and one-half percent, a variable C is set equal to one in a step 330.

If the CFD is nonoperational, a decision is made in a decision step 332 as to whether the current SAS position value is less than twenty-five percent of full SAS actuator travel. If not, a decision is made in a decision step 334 as to whether the current SAS position value is greater than seventy-five percent of full SAS actuator travel. If the SAS position value is determined in the step 332 to be less than twenty-five percent of full SAS actuator travel, a variable B is set equal to one in a step 336. If the SAS position value is determined in the step 334 to be less than seventy-five percent of full SAS actuator authority then the logical flow is returned to the initializing step 302. If it is greater than seventy-five percent, a variable D is set equal to one in a step 338.

In this way, if the current SAS position value is within a selected range, then one of the variables A, B, C, or D is set to equal one.

If the SAS position value is within a selected range, the logical flow next enters a decision step 340, in which a decision is made as to whether the current trim actuator rate of change in position is less than negative two and one-half percent of full trim actuator positional control authority per second. In the best mode embodiment, two and one-half percent of authority per second is equal to one-half the maximum rate to which the trim actuator is limited by design in either direction. If the rate is greater than negative two and one-half percent per second, a decision is made in a step 342 as to whether the current trim actuator rate is greater than two and one-half percent of authority per second. If the rate is less than negative two and one-half percent per second in the step 340, a decision is made in a step 344 as to whether the variable C is equal to one or not. If the decision made in the step 342 is that the trim rate is not greater than two and one-half percent per second, then the logical flow is returned to the initializing step 302.

If the decision made in the step 342 is that the trim rate is greater than two and one-half percent per second, then a decision is made in a step 346 as to whether the variable A is equal to one or not. If the decision made in the step 344 is that the variable C does not equal one, then a decision is made in a step 348 as to whether the variable D is equal to one or not. Similarly, if the decision made in the step 346 is that the variable A is not equal to one, then a decision is made in a step 350 as to whether the variable B is equal to one or not. If a decision is made in either step 348, 350 that the variable D or B is not equal to one, then the logical flow is returned to the initializing step 302. If a decision is made in any of the steps 344, 346, 348, 350 that one of the variables A, B, C, D is equal to one, then the decision is made in a step 352 as to whether or not the airspeed is less than forty-five knots.

If the decision in the step 352 is that the airspeed is greater than forty-five knots, a decision in a step 354 is made as to whether the trim release pushbutton is pressed. If the decision is that it is not pressed, a decision in a step 356 is made as to whether or not there is any roll stick force. If the decision is that there is no roll stick force, then a decision is made in a step 358 as to whether or not the operator has actuated one of the pedal switches. If any of the decisions in the steps 352, 354, 356, 358 result in an affirmative decision, then the logical flow is returned to the initializing step 302.

If the result of the decision in the step 358 is that the operator has not actuated a pedal switch, the value of a variable G is incremented by the value of one in a step 360. A decision is then made in a step 362 as to whether the value of the variable G is greater than the selected numerical value of two tenths of the value of the clock repetition rate. If the value of G is less than the selected value, the logical flow is returned to the step 316. If the values of the yaw SAS actuator position and trim actuator rate remain within the selected ranges for a period equal to 200 milliseconds, the value of G will be incremented through successive passes through the logic loop until it is greater than two-tenths of the value of the clock rate. If the result of the decision in the step 362 is that the value of G is greater than the selected value, then the shutdown of the yaw trim actuator is effected in a step 364. The logical flow then ends in a step 366.

The shutdown monitor circuit of FIG. 1 and the signal processor of FIG. 2 are shown implemented for a particular yaw pitch axis control channel that may have peculiarities and be different from other possible control system configurations in which the present invention may be utilized. For example, if the invention is utilized in another of the pitch axis control channels or other control loops, the status of the AFCS may not be significant, or if it is, it may be significant in a different way. Different inhibit signals may be used. The pitch axis control channel or control loop may differ in the mechanical elements, their structure, function and number. The direction indicator may have only a trim actuator rate detector or a SAS actuator position detector, i.e., only one of the actuators is monitored for a parameter within a selected range of values. In such a direction indicator, the actuator that is not being monitored for a signal within a selected range would merely be continuously monitored for direction.

The flow chart of FIG. 3 illustrates one routine suitable for implementing the shutdown monitor function in the processor of FIG. 2. As may be obvious to those skilled in the programming art, any one of a number of alternative programs may be implemented which provide the same function of monitoring the positions of inner and outer loop actuators to determine if they are undergoing positional movements or rates in opposite directions within selected ranges and for shutting down an actuator under certain conditions and according to a sequence of steps and for inhibiting such a shutdown under other specified conditions.

It should also be understood that the implementations of FIGS. 1 and 2 are not necessarily mutually exclusive since certain functions performed in the hardware of FIG. 1 may be performed by a simple subroutine in an available program that may be utilized by the hardware of FIG. 1 without losing its character as hardware. Similarly, the signal processor of FIG. 2 may be interfaced with other hardware that may perform one or more steps of the logical sequence of FIG. 3 in a fashion that results in the particular implementation retaining some or even most of its character as a signal processing shutdown monitor. Or a hybrid shutdown monitor might be devised that incorporates sufficient signal processing and hardware features so as to lose its predominantly hardware or signal processing character as described herein.

It should also be understood that the phrase "direction of travel" as used throughout the specification and claims is used in a functional sense and is not necessarily restricted to a meaning that requires motion or the sensing thereof. For example, in the best mode embodiment, the position of the SAS actuator is monitored with a position sensor. From a particular position value presently within one of the two selected ranges of position values at the extremes of the actuator's travel, one of the two possible directions of travel is inferred. Thus, it is evident that the "direction of travel" of the SAS actuator may be inferred from its position within one of the two extreme ranges of position values and the inference is not necessarily dependent upon the sensing of absolute motion in a particular "direction of travel". It should also be understood that other inference techniques concerning the "direction of travel" of a particular actuator may be utilized and should not be restricted to the position sensing technique described in the example.

Similarly, although the invention has been shown and described with respect to preferred embodiments thereof, it should be understood by those skilled in the art that the foregoing and various other changes, omissions, and additions may be made therein without departing from the spirit and scope of the invention.

We claim:

1. Apparatus for selectively disabling the trim actuator of an aircraft outer loop axis control channel having an inner loop stability augmentation system (SAS) actuator which in combination with the trim actuator maintains aircraft attitude in an associated control axis, each actuator capable of reciprocating motion within a related range of position values, and each having a position sensor for providing a signal indicative of the actual actuator position value in the range, the rate of change of position and direction of travel of the trim actuator determinating the position and direction of travel of the SAS actuator to provide, in combination, supportive effect on the aircraft attitude in the associated axis, the apparatus comprising:

direction indicating means, responsive to each actuator position signal, for providing a trim actuator direction signal indicative of the direction of travel of the trim actuator at a rate of change of position, and for providing a SAS actuator direction signal indicative of the direction of travel of the SAS actuator within a selected range of SAS actuator position values;

opposite direction detector means, responsive to said direction indicating means, for providing a trim actuator disable signal in response to the simultaneous presence of said trim actuator direction signal and said SAS actuator direction signal indicating directions of travel having opposing effects on the aircraft attitude in the control axis; and means for disabling operation of the trim actuator in response to the presence of said trim actuator disable signal.

2. The apparatus of claim 1, wherein said direction indicating means comprises:

SAS actuator position signal comparator means responsive at a first input to the SAS actuator position signal and responsive at a second input to a SAS actuator selected reference signal, for providing signals indicative of each direction of reciprocating travel of the SAS actuator when the absolute value of the position signal exceeds the absolute value of the reference signal.

3. The apparatus of claim 1, wherein said selected range of SAS actuator position values includes the range of from zero to twenty-five percent and from seventy-five to one hundred percent of the full range of said SAS actuator position values.

4. The apparatus of claim 1, further comprising inhibit means operatively connected between said opposite direction detector means and said disable means, and including:
sensor means, responsive to the presence of selected flight conditions which, although acceptable to aircraft performance, have the characteristic of creating an opposing direction of travel condition by the trim actuator and by the SAS actuator within said selected range, and for providing an inhibit signal in the presence of said condition; and
gate means, responsive to said opposite direction detector means and to said sensor means for inhibiting presentation of said trim actuator disable signal in the presence of said sensor means inhibit signal, and for allowing presentation of said trim actuator disable signal to said disable means at all other times.

5. Apparatus for selectively disabling the trim actuator of an aircraft outer loop axis control channel having an inner loop stability augmentation system (SAS) actuator which in combination with the trim actuator maintains aircraft attitude in an associated control axis, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, the apparatus comprising:
direction indicating means, responsive to each actuator position signal, for providing a trim actuator direction signal indicative of the direction of travel of the trim actuator at a rate of change of position, the absolute value of which is greater than the absolute value of a selected rate value, and for providing a SAS actuator direction signal indicative of the direction of travel of the SAS actuator;
opposite direction detector means, responsive to said direction indicating means, for providing a trim actuator disable signal in response to the simultaneous presence of said trim actuator direction signal and said SAS actuator direction signal indicating directions of travel having opposing effects on the aircraft attitude in the control axis; and
means for disabling operation of the trim actuator in response to the presence of said trim actuator disable signal.

6. The apparatus of claim 5, wherein said direction indicating means, comprises:
time derivative signal means, responsive to the trim actuator position sensor for providing the change in magnitude of the position signal with respect to time as a bipolar rate signal magnitude; and
rate detector means, responsive to said rate signal for providing said trim actuator direction signal in response to a rate signal having an absolute value greater than the absolute value of a selected rate value.

7. The direction indicating means of claim 5, wherein said selected rate value equals one-half of the actuator rate limit.

8. The apparatus of claim 5, further comprising inhibit means operatively connected between said opposite direction detector means and said disable means, and including:
sensor means, responsive to the presence of selected flight conditions which, although acceptable to aircraft performance, have the characteristic of creating an opposing direction of travel condition by the trim actuator moving at a rate greater than said selected rate and by the SAS actuator, and for providing an inhibit signal in the presence of said condition; and
gate means responsive to said opposite direction detector means and to said sensor means for inhibiting presentation of said trim actuator disable signal in the presence of said sensor means inhibit signal, and for allowing presentation of said trim actuator disable signal to said disable means at all other times.

9. Apparatus for selectively disabling the trim actuator of an aircraft outer loop axis control channel having an inner loop stability augmentation system (SAS) actuator which in combination with the trim actuator maintains aircraft attitude in an associated control axis, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, the apparatus comprising:
direction indicating means, responsive to each actuator position signal, for providing a trim actuator direction signal indicative of the direction of travel of the trim actuator at a rate of change of position, the absolute value of which is greater than the absolute value of a selected rate value, and for providing a SAS actuator direction signal indicative of the direction of travel of the SAS actuator within a selected range of SAS actuator position values;
opposite direction detector means, responsive to said direction indicating means, for providing a trim actuator disable signal in response to the simultaneous presence of said trim actuator direction signal and said SAS actuator direction signal indicating directions of travel having opposing effects on the aircraft attitude in the control axis; and
means for disabling operation of the trim actuator in response to the presence of said trim actuator disable signal.

10. The apparatus of claim 9, wherein said direction indicating means, comprises:
time derivative signal means, responsive to the trim actuator position sensor for providing the change in magnitude of the position signal with respect to time as a bipolar rate signal magnitude;
rate detector means, responsive to said rate signal for providing said trim actuator direction signal in response to a rate signal having an absolute value greater than the absolute value of a selected rate value; and
SAS actuator position signal comparator means responsive at a first input to the SAS actuator position signal and responsive at a second input to a SAS actuator selected reference signal, for providing signals indicative of reciprocating travel of the SAS actuator when the absolute value of the position signal exceeds the absolute value of the reference signal.

11. The apparatus of claim 9, wherein said selected range of SAS actuator position values includes the range of from zero to twenty-five percent and from seventy-five to one hundred percent of the full range of said SAS actuator position values.

12. The direction indicating means of claim 9, wherein said selected rate value equals one-half of the actuator rate limit.

13. The apparatus of claim 9, further comprising inhibit means operatively connected between said opposite direction detector means and said disable means, and including:
sensor means, responsive to the presence of selected flight conditions which, although acceptable to aircraft performance, have the characteristic of creating an opposing direction of travel condition by the trim actuator moving at a rate greater than said selected rate and by the SAS actuator within said selected range, and for providing an inhibit signal in the presence of said condition; and
gate means, responsive to said opposite direction detector means and to said sensor means for inhibiting presentation of said trim actuator disable signal in the presence of said sensor means inhibit signal, and for allowing presentation of said trim actuator disable signal to said disable means at all other times.

14. Apparatus for selectively disabling the trim actuator of an aircraft outer loop axis control channel having an inner loop stability augmentation system (SAS) actuator which in combination with the trim actuator maintains aircraft attitude in an associated control axis, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, and the aircraft having a coupled flight director system (CFD), the apparatus comprising:
direction indicating means, responsive to each actuator position sensor, for providing a trim actuator direction signal indicative of the direction of travel of the trim actuator at a rate of change of position and for providing a SAS actuator direction signal indicative of the direction of travel of the SAS actuator within a selected range of SAS actuator position values;
opposite direction detector means, responsive to said direction indicating means, for providing a trim actuator disable signal in response to the simultaneous presence of said trim actuator direction signal and said SAS actuator direction signal indicating directions of travel having opposing effects on the aircraft attitude in the control axis; and
means for disabling operation of the trim actuator in response to the presence of said trim actuator disable signal.

15. The apparatus of claim 14, further comprising means responsive to the operational state of the (CFD) for changing the limits of said selected range of SAS actuator position values.

16. The apparatus of claim 15, wherein said selected range of SAS actuator position values includes the range of from zero to twenty-five percent and from seventy-five to one hundred percent of the full range of said SAS actuator position values if the (CFD) is nonoperational and wherein said selected range includes the values from zero to twelve and one-half percent and from eighty-seven and one-half to one hundred percent of the full range of said SAS actuator position values if the (CFD) is operational.

17. The apparatus of claim 14, further comprising inhibit means operatively connected between said opposite direction detector means and said disable means, and including:
sensor means, responsive to the presence of selected flight conditions which, although acceptable to aircraft performance, have the characteristic of creating an opposing direction of travel condition by the trim actuator and the SAS actuator within said selected range, and for providing an inhibit signal in the presence thereof; and
gate means, responsive to said opposite direction detector means and to said sensor means for inhibiting presentation of said trim actuator disable signal in the presence of said sensor means inhibit signal, and for allowing presentation of said trim actuator disable signal to said disable means at all other times.

18. Apparatus for selectively disabling the trim actuator of an aircraft outer loop axis control channel having an inner loop stability augmentation system (SAS) actuator which in combination with the trim actuator maintains aircraft attitude in an associated control axis, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, and the aircraft having a coupled flight director system (CFD), the apparatus comprising:
direction indicating means, responsive to each actuator position sensor, for providing a trim actuator direction signal indicative of the direction of travel of the trim actuator, at a rate of change of position, the absolute value of which is greater than the absolute value of a selected rate value, and for providing a SAS actuator direction signal indicative of the direction of travel of the SAS actuator within a selected range of SAS actuator position values;
opposite direction detector means, responsive to said direction indicating means, for providing a trim actuator disable signal in response to the simultaneous presence of said trim actuator direction signal and said SAS actuator direction signal indicating direction of travel having opposing effects on the aircraft attitude in the control axis; and
means for disabling operation of the trim actuator in response to the presence of said trim actuator disable signal.

19. The apparatus of claim 18, further comprising means responsive to the operational state of the (CFD) for changing the limits of said selected range of SAS actuator position values.

20. The apparatus of claim 19, wherein said selected range of SAS actuator position values includes the range of from zero to twenty-five percent and from seventy-five to one hundred percent of the full range of said SAS actuator position values if the CFD is nonoperational and wherein said selected range includes the values from zero to twelve and one-half percent and from eighty-seven and one-half to one hundred percent of the full range of said SAS actuator position values if the CFD is operational.

21. The apparatus of claim 18, further comprising inhibit means operatively connected between said opposite direction detector means and said disable means, and including:

sensor means, responsive to the presence of selected flight conditions which, although acceptable to aircraft performance, have the characteristic of creating an opposing direction of travel condition by the trim actuator moving at a rate greater than said selected rate and the SAS actuator within said selected range, and for providing an inhibit signal in the presence thereof; and gate means, responsive to said opposite direction detector means and to said sensor means for inhibiting presentation of said trim actuator disable signal in the presence of said sensor means inhibit signal, and for allowing presentation of said trim actuator disable signal to said disable means at all other times.

22. A method for monitoring and selectively disabling a trim actuator in an aircraft outer control loop having an inner control loop stability augmentation system (SAS) actuator which in combination with the trim actuator maintains aircraft attitude in an associated control axis during flight, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, comprising the steps of:

determining the value of the rate of change of position of the trim actuator establishing a trim actuator direction state indicative of the direction of travel of the trim actuator, defining a selected range of SAS actuator position values, comparing the magnitude of the SAS actuator position signal value to said selected range of position values and establishing, in response to a position signal value magnitude within said selected range of position, a SAS actuator direction state indicative of the direction of travel of the SAS actuator within said selected range of SAS actuator position values, detecting the simultaneous presence of said trim actuator direction state and said SAS actuator direction state indicating directions of travel having opposing effects on the aircraft attitude in the control axis, and providing a trim actuator disable signal in response thereto, disabling operation of the trim actuator in response to the presence of said trim actuator disable signal.

23. The method for monitoring and selectively disabling a trim actuator according to claim 22, wherein said step of defining includes a selected range of from zero to twenty-five percent and from seventy-five to one hundred percent of the full range of said SAS actuator position values.

24. The method of claim 22, further comprising the steps of:

sensing the presence of selected flight conditions which, although acceptable to aircraft performance, have the characteristic of creating an opposing direction of travel condition by the trim actuator and by the SAS actuator within said selected range, and inhibiting said trim actuator disable signal in the presence of said selected flight conditions.

25. A method for monitoring and selectively disabling a trim actuator in an aircraft outer control loop having an inner control loop stability augmentation system (SAS) actuator which in combination with the trim actuator maintains aircraft attitude in an associated control axis during flight, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, comprising the steps of:

determining the value of the rate of change of position of the trim actuator, defining a selected range of trim actuator position rate values, comparing the determined trim actuator position rate value to said selected range of rate values and providing, in response to the determined rate value magnitude within said selected range of rates, a trim actuator direction signal indicative of the direction of travel of the trim actuator, establishing a SAS actuator direction state indicative of the direction of travel of the SAS actuator, detecting the simultaneous presence of said trim actuator direction state and said SAS actuator direction state indicating directions of travel having opposing effects on the aircraft attitude in the control axis, and providing a trim actuator disable signal in response thereto, disabling operation of the trim actuator in response to the presence of said trim actuator disable signal.

26. The method for monitoring and selectively disabling a trim actuator according to claim 25, wherein said step of defining includes a selected rate value limit equal to one-half of the maximum designed trim actuator rate limit.

27. The method of claim 25, further comprising the steps of:

sensing the presence of selected flight conditions which, although acceptable to aircraft performance, have the characteristic of creating an opposing direction of travel condition by the trim actuator and by the SAS actuator within said selected range, and inhibiting said trim actuator disable signal in the presence of said selected flight conditions.

28. A method of monitoring and selectively disabling a trim actuator in an aircraft outer control loop having an inner control loop stability augmentation system (SAS) actuator which in combination with the trim actuator maintains aircraft attitude in an associated control axis during flight, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, comprising the steps of:

determining the value of the rate of change of position of the trim actuator, defining a selected range of trim actuator position rate values, comparing the determined trim actuator position rate value to said selected range of rate values and establishing, in response to a determined rate value magnitude within said selected range of rates, a trim actuator direction state indicative of the direction of travel of the trim actuator, defining a selected range of SAS actuator position values, comparing the magnitude of the SAS actuator position signal value to said selected range of position values and establishing, in response to a position signal value magnitude within said selected range of positions, a SAS actuator direction state indicative of the direction of travel of the SAS actuator within said selected range of SAS actuator position values, detecting the simultaneous presence of said trim actuator direction state and said SAS actuator direction state indicating directions of travel having opposing effects on the aircraft attitude in the control axis, and providing a trim actuator disable signal in response thereto, disabling operation of the trim actuator in response to the presence of said trim actuator disable signal.

29. The method for monitoring and selectively disabling a trim actuator according to claim 28, wherein said step of defining a selected range of trim actuator position rate values includes a selected rate value limit equal to one-half of the maximum designed trim actuator rate.

30. The method for monitoring and selectively disabling a trim actuator according to claim 28, wherein said step of defining a selected range of SAS actuator position values includes a selected range of from zero to twenty-five percent and from seventy-five to one hundred percent of the full range of said SAS actuator position values.

31. The method of claim 28, further comprising the step of:

sensing the presence of selected flight conditions which, although acceptable to aircraft performance, have the characteristic of creating an opposing direction of travel condition by the trim actuator and by the SAS actuator within said selected range, and inhibiting said trim actuator disable signal in the presence of said selected flight conditions.

32. A method for monitoring and selectively disabling a trim actuator in an aircraft outer control loop having an inner control loop stability augmentation system (SAS) actuator which in combination with the trim actuator maintains aircraft attitude in an asssociated control axis during flight, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, and the aircraft having a coupled flight director system (CFD), comprising the steps of:

determining the value of the rate of change of position of the trim actuator, establishing a trim actuator direction state indicative of the direction of travel of the trim actuator, defining a selected range of SAS actuator position values comparing the magnitude of the SAS actuator position signal value to said selected range of position values and establishing, in response to a position signal value magnitude within said selected range of positions, a SAS actuator direction state indicative of the direction of travel of the SAS actuator within said selected range of SAS actuator position values, detecting the simultaneous presence of said trim actuator direction state and said SAS actuator direction state indicating directions of travel having opposing effects on the aircraft attitude in the control axis, and providing a trim actuator disable signal in response thereto, disabling operation of the trim actuator in response to the presence of said trim actuator disable signal.

33. The method of claim 32, wherein said step of defining depends on the operational state of the CFD for changing the limits of said selected range of SAS actuator position values.

34. The method of claim 33, wherein said selected range of SAS actuator position values includes the range of from zero to twenty-five percent and from seventy-five to one hundred percent of the full range of said SAS actuator position values if the CFD is nonoperational and wherein said selected range includes the values from zero to twelve and one-half percent and from eighty-seven and one-half to one hundred percent of the full range of said SAS actuator position values if the CFD is operational.

35. The method of claim 32, further comprising the steps of:

sensing the presence of selected flight conditions which, although acceptable to aircraft performance, have the characteristic of creating an opposing direction of travel condition by the trim actuator and by the SAS actuator within said selected range, and inhibiting said trim actuator disable signal in the presence of said selected flight conditions.

36. A method for monitoring and selectively disabling a trim actuator in an aircraft outer control loop having an inner control loop stability augmentation system (SAS) actuator which in combination with the trim actuator maintains aircraft attitude in an associated control axis during flight, each actuator capable of reciprocating motion within a related range of position values, and each having a position sensor for providing a signal indicative of the actual actuator position value in the range, the rate of change of position and direction of travel of the trim actuator determining the position and direction of travel of the SAS actuator to provide, in combination, supportive effect on the aircraft attitude in the associated axis, and the aircraft having a coupled flight director system (CFD), comprising the steps of:

determining the value of the rate of change of position of the trim actuator, defining a selected range of trim actuator position rate values, comparing the determined trim actuator position rate value to said selected range of rate values and establishing in response to a determined rate value magnitude within said selected range of rates, a trim actuator direction state indicative of the direction of travel of the trim actuator, defining a selected range of SAS actuator position values, comparing the magnitude of the SAS actuator position signal value to said selected range of position values and establishing, in response to a position signal value magnitude within said selected range of positions, a SAS actuator direction state indicative of the direction of travel of the SAS actuator within said selected range of SAS actuator position values.

detecting the simultaneous presence of said trim actuator direction state and said SAS actuator direction state indicating directions of travel having opposing effects on the aircraft attitude in the control axis, and providing a trim actuator disable signal in response thereto, disabling operation of the trim actuator in response to the presence of said trim actuator disable signal.

37. The method of claim 36, wherein said step of defining a selected range of SAS actuator position values depends on the operational state of the CFD for changing the limits of said selected range of SAS actuator position values.

38. The method of claim 37, wherein said selected range of SAS actuator position values includes the range of from zero to twenty-five percent and from seventy-five to one hundred percent of the full range of said SAS actuator position values if the CFD is nonoperational and wherein said selected range includes the values from zero to twelve and one-half percent and from eighty-seven and one-half to one hundred percent of the full range of said SAS actuator position values if the CFD is operational.

39. The method of claim 36, further comprising the steps of:

sensing the presence of selected flight conditions which, although acceptable to aircraft performance, have the characteristic of creating an opposing direction of travel condition by the trim actuator and by the SAS actuator within said selected range, and inhibiting said trim actuator disable signal in the presence of said selected flight conditions.

* * * * *